US 9,460,225 B2

(12) United States Patent
Findeisen

(10) Patent No.: US 9,460,225 B2
(45) Date of Patent: Oct. 4, 2016

(54) SYSTEM AND METHOD FOR COLLECTING APPLICATION PERFORMANCE DATA

(75) Inventor: Piotr Findeisen, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1345 days.

(21) Appl. No.: 13/375,125

(22) PCT Filed: Jun. 1, 2009

(86) PCT No.: PCT/US2009/045865
§ 371 (c)(1),
(2), (4) Date: Nov. 29, 2011

(87) PCT Pub. No.: WO2010/141010
PCT Pub. Date: Dec. 9, 2010

(65) Prior Publication Data
US 2012/0079108 A1    Mar. 29, 2012

(51) Int. Cl.
*G06F 15/173*    (2006.01)
*G06F 17/30*    (2006.01)
*G06F 11/34*    (2006.01)

(52) U.S. Cl.
CPC ....... *G06F 17/3089* (2013.01); *G06F 11/3419* (2013.01); *G06F 11/3466* (2013.01); *G06F 2201/875* (2013.01)

(58) Field of Classification Search
USPC ....... 717/130, 131; 705/14.73; 714/38, 38.1; 715/772; 709/224
See application file for complete search history.

(56) References Cited

U.S. PATENT DOCUMENTS

| | | | |
|---|---|---|---|
| 5,297,274 A | 3/1994 | Jackson | |
| 8,949,671 B2* | 2/2015 | Mukherjee | G06F 11/0718 714/26 |
| 2004/0059544 A1 | 3/2004 | Smocha et al. | |
| 2006/0130001 A1* | 6/2006 | Beuch | G06F 11/3466 717/130 |
| 2006/0206885 A1* | 9/2006 | Seidman et al. | 717/148 |
| 2009/0193298 A1* | 7/2009 | Mukherjee | G06F 11/0718 714/38.1 |
| 2010/0042504 A1* | 2/2010 | Shenfield | G06Q 30/02 705/14.73 |
| 2010/0251160 A1* | 9/2010 | Shafi et al. | 715/772 |

OTHER PUBLICATIONS

Guijie, Ma et al., Design and implementation of parallel program performance analysis method based on instrumentation technology, Study on Application Computers, vol. 24, No. 10, Oct. 31, 2007, 4 pages.
State Intellectual Property Office of People's Republic of China, Search Report, Aug. 5, 2013, 2 pages, Beijing, China.
Shende et al. 'Dynamic Performance Callstack Sampling: Merging TAU and DAQV.' In: Applied Parallel Computing, Large Scale Scientific and Industrial Problems, 4th International Workshop, 1998, ISBN 3-540-65414-3, pp. 515-520.

* cited by examiner

*Primary Examiner* — Kyung H Shin
(74) *Attorney, Agent, or Firm* — Thorpe, North & Western LLP

(57) ABSTRACT

Systems and methods are provided for collecting application performance data. The system (100) includes a server (110) for hosting a server-side application (120). An instrumentation module (130) is included on the server. The instrumentation module can selectively instrument functions (125) of the server-side application to obtain instrumented function operation data. The instrumentation module can also maintain an instrumented function call stack (190) for each application thread. A sampling module (140) is included on the server. The sampling module can sample application threads of the server-side application to obtain sampled function operation data. The sampling module can sample application threads based on at least one of an age of a timestamp obtained through instrumentation and a determination of which threads are executing server requests based on emptiness of the stack.

20 Claims, 4 Drawing Sheets

SYSTEM AND METHOD FOR COLLECTING APPLICATION PERFORMANCE DATA

BACKGROUND

Performance issues in critical business applications are typically hard to reproduce in test environments. In at least some cases, this may be because the applications are tested and tuned for performance in a pre-production environment and are released for production after the performance test passed. It is often hard or even impossible for test environments to test all conditions under which the application will be executed in a production environment, when the application is faced with a real load and real data.

Often, performance issues in production are exposed only at infrequent intervals, such as when a certain combination of specific data, specific user interactions, specific database states, and/or specific timing is encountered. As a result, detecting and identifying conditions causing performance issues or problems can be challenging.

A common architectural model for server-side applications today is based on a reactive principle. Specifically, the server performs some work upon receiving an external event (request) through a well-defined protocol (HTTP, RMI, SOAP, etc.), and may send a response (result) to the requesting party. The unit of work performed upon receiving a single event is sometimes called a "server request". A major indicator of server performance is server request latency, i.e., the time elapsed between receiving the requesting event until a response is sent.

A performance analyst may be interested in determining which server requests took a long time to execute. There are a number of tools available that are directed at addressing this need. A performance analyst may also be interested in seeing internal details of long running server requests to understand and pinpoint root causes of delay. This can pose severe technical challenges. There is generally a strong trade-off between the amount and quality of collected data about a server request's execution and die performance overhead of the data collection. The trade-off is made even more profound by the fact that the server request latency is not known when the server request starts and most data collection techniques are not capable of capturing data retroactively. Thus, prior systems may force data collection for all server requests or for a randomly selected subset of requests and risk missing server requests which are causing issues.

DETAILED DESCRIPTION

Figure 1:
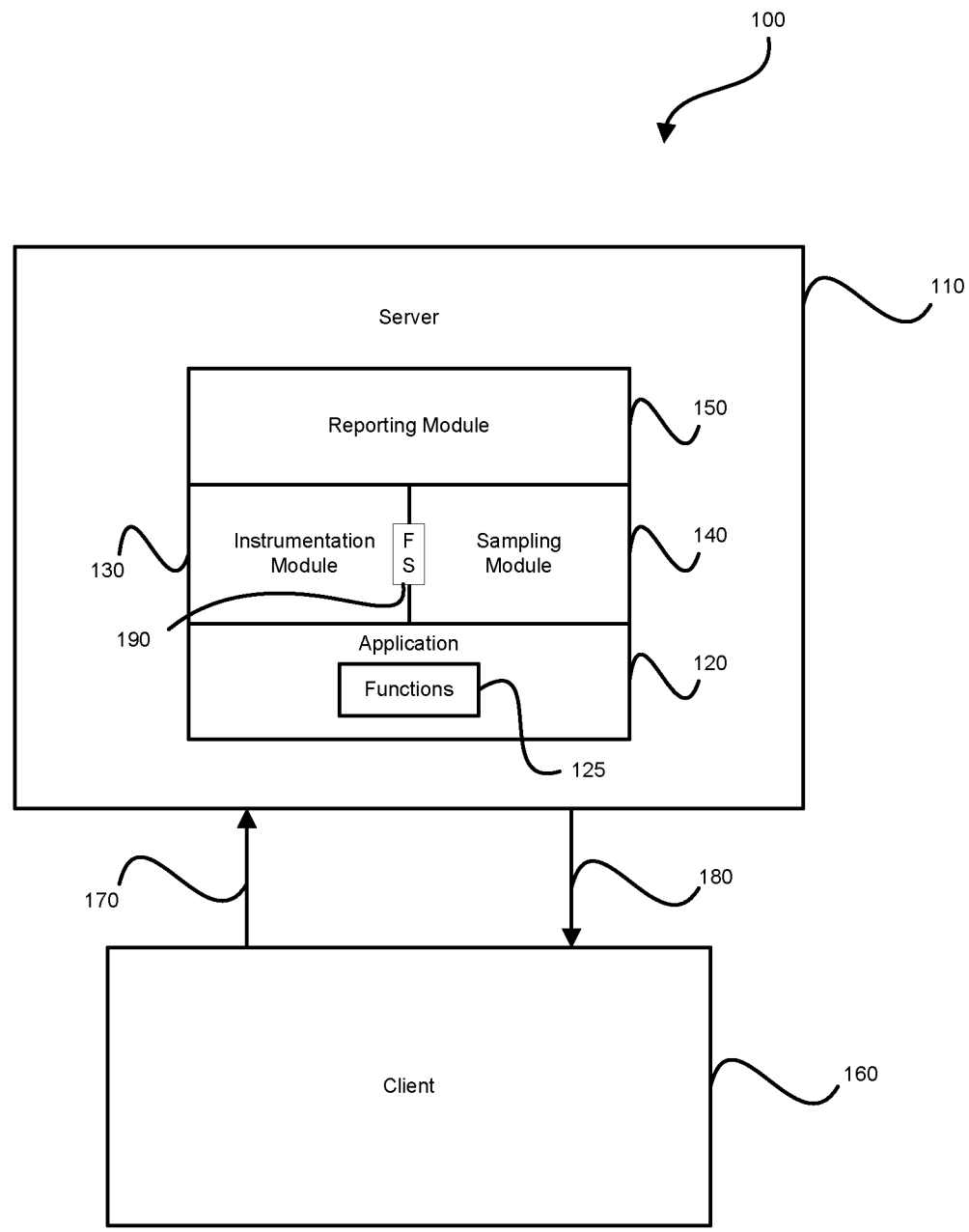
FIG. 1 is a block diagram of a system for collecting application performance data in accordance with an embodiment.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, various technical embodiments.

Troubleshooting performance issues encountered by multi-tiered server applications deployed in production environments can be a challenging task for information technology (IT) personnel. Application performance constraints often do not allow for the use of profiling tools, and performance issues cannot always be reproduced in test environments. With increasing application complexity and applications more frequently using one or more third party components, pinpointing the root causes of long latency for a server request can be difficult for developers of an application. Previous efforts to overcome such difficulties have met only limited success.

Described herein is a system and method for collecting application performance data to find trouble spots in deployed business applications which overcomes many of the aforementioned difficulties. The use of tracing, sampling, and other data collection techniques can happen at multiple levels:

1) At the data collection level, to minimize the overlap of sampling and tracing and to keep the overhead low;
2) At the data processing level, to reconcile the different ways in which sampling and tracing techniques operate; and
3) At the graphical user interface level, to provide the user with uniform experience.

Two techniques for the collection of the application performance data (i.e. "profiling") are tracing and sampling. Tracing is sometimes called event-based profiling and is based on instrumentation. Instrumentation can be a modification of the application code to capture the start and end of selected functions, and may be automatic. Instrumentation is sometimes extended to capture function arguments, selected data points, or other artifacts related to the application execution. Tracing is capable of delivering very rich and precise information about the application execution, but tracing suffers from very large overhead. A typical tracing-based profiler, when instrumenting all functions (methods) in an average Java language application, can impose about 2500-4000% overhead. In other words, the profiled application consumes about 25 to 40 times more processing power of a Central Processing Unit (CPU) than the same application without profiling. Such a large overhead can make tracing profilers practically unusable in production environments.

Sampling is another profiling technique and is based on periodic examination of stack traces for all threads within the application. Sampling generally does not deliver start and end events for the functions within the application and cannot usually retrieve any arguments. Sampling can capture caller-callee (i.e., functions called from the caller) relationships at some time points, and function latencies can be only estimated when using sampling. A strength of sampling is its relatively low "cost" (i.e., overhead) compared to tracing. A typical sampling-based profiler, when sampling with high frequency (currently up to about 100 times per second or more) can impose an overhead of about 100% (i.e. the profiled application consumes about twice as much CPU as the same application without profiling).

The accuracy of approximation of function latencies increases with the number of samples taken. Sampling frequency can be increased to increase the number of samples, but increased sampling frequency also increases the overhead. Alternatively, the profiler can be run for a longer time to increase the total number of samples. This provides reasonable data for average or aggregate server requests. However, this may not provide sufficient data for analysis if only very few server requests show performance problems, which is often the case. Therefore sampling is often used for figuring out where an application spends most of its time in general but may be unsuitable for even identifying individual server requests.

One technique which can satisfy strict performance limitations and at the same time provides useful information for application specialists is selective code instrumentation. In selective code instrumentation only a few functions within the application are instrumented. The instrumentation provides function entry/exit events, which are timestamped and presented to the user as a call tree for one or more server requests executed by the application. The call tree is incomplete, but proper selection of the functions to instrument can at least enable identification of the application component(s) or module(s) suffering from performance problems.

However, selective instrumentation still has drawbacks. Although an application specialist may be able to identify a function invocation which took a long time to complete, the root cause of the performance problem may not be found if there is not enough information about the callees. Information about the callees can be obtained by inserting new instrumentation into the application. However, this is often not an easy task. First, the performance analyst must understand the application code well enough to identify potential callees and be sure that the added instrumentation will not increase the performance overhead to an intolerable level. Second, many runtime environments do not have the capability of injecting instrumentation code into an application during runtime. Such instrumentation changes may mean that the application will be restarted upon every change in the instrumentation plan and entail various business level impacts during production execution.

Described herein are systems and methods for collecting application performance data. A method includes selectively instrumenting a server-side application on a server to obtain instrumented function operation data including timestamps of application threads. Application threads having a timestamp older than a predetermined period of time are sampled to obtain sampled function operation data. The instrumented function operation data and the sampled function operation data are combined to form a unified application performance report.

Referring to FIG. 1, a system 100 is provided for collecting application performance data, in accordance with an embodiment. The system can include a server 110 configured to host a server-side application 120. The application may comprise any number of functions 125 and any number of threads. Application requests 170 and responses 180 may be sent to and from the server. For example, a user using a client 160 may wish to access or interface with a web application. The client may send a request 170 to the server for information. The server can send a response 180 to the client. As can be appreciated by one having skill in the art, there may be any number of devices between the client and the server, such as routers, switches, other servers, etc. facilitating transmission of data between the client and the server.

An instrumentation module 130 may be included on the server 110. The instrumentation module can be configured to instrument functions of the server-side application 120. Function operation data can be obtained through instrumentation of the application. Any number of functions 125 may be instrumented, and the instrumented functions may be instrumented to any desired degree. However, an increase in overhead occurs with an increase in instrumentation. In one aspect, only selected functions are instrumented. Additionally, the instrumentation of the selected functions may be limited so as to collect only certain data to keep overhead low. Examples of instrumented function operation data that can be collected may include function identification (name/signature), caller/callee relationships, timestamps (for events such as function start/end), variable values, function arguments, thrown/caught exceptions, lock contention, and other information. Many other types of information may also be obtained through instrumentation as is understood by one having skill in the art.

One purpose of instrumentation can be to identify slow functions in server requests executed by the application. Instrumentation of the application code can report function start/end events. These events can be used to maintain an instrumented function call stack 190 representing active instrumented functions for each thread. The instrumented function call stack can include selected operation data for the instrumented functions, such as the function identification and the timestamp for the function start event. This instrumented function call stack is separate and distinct from a call stack provided by the application runtime environment. The instrumented function call stack can be easily accessed by a monitoring tool or reporting module for reporting information contained in the stack to a user. Apart from the instrumented function stack, the code instrumentation can maintain a timestamp for the recentmost function start/end events. Maintaining this timestamp does not incur additional overhead, because the start/end events are time-stamped anyway.

The system 100 can include a sampling module 140 on the server 110. The sampling module can be configured to sample application threads of the server-side application. The sampling module can be configured to sample only certain threads. As described above, an instrumented function stack 190 of active instrumented functions can be maintained for each thread. If an instrumented function stack for a particular thread is empty then there are no current active instrumented functions for that thread. Therefore, overhead can be reduced by only sampling those threads presently executing server requests. In other words, the system may be configured to sample only those threads with a non-empty instrumented function stack.

Instrumented function stack trace sampling can be performed by a dedicated sampling thread. The sampling thread can be configured to periodically wakeup and examine all remaining threads to find candidates to sample. In one aspect described above, threads with a non-empty instrumented function call stack may be a candidate for sampling. In another aspect, to limit sampling and reduce overhead, the sampling thread can be configured to analyze a timestamp of the last event in a particular thread or stack. If the last event is recent, the system may deem sampling unnecessary because instrumentation may have already delivered sufficient information about the thread behavior. If the last event has a timestamp older than a predetermined period of time, sampling may be deemed useful. As time passes and no events are reported by the instrumentation, the information provided by the instrumentation may not be deemed sufficient to provide as much detail or accuracy as desired. The period of time relevant for determining that an event is recent or distant may be relative to the operation of the application or a particular function. In some examples, it may be sufficient to determine the period of time for sampling in seconds or milliseconds. Other examples may allow for determination of time periods of greater intervals or may require finer determination of time periods for sampling (e.g., microseconds).

If no instrumentation-based events have been visible on a thread for a predetermined period of time, sampling may be deemed useful. In this example, sampling can fill a large gap in time created by two consecutive instrumentation-based events. For example, a performance analyst may be interested in knowing what is happening in a particular thread at a given time, but in some circumstances there may be no instrumented function invocations during this time period from which to gain this information (although there may be instrumentation-based events before and/or after the time period). In this example, sampling may be used to provide the performance analyst with at least some of the desired information.

Additional determination as to whether a thread is a candidate for sampling can be made by analyzing a topmost instrumented function placed on the instrumented function stack associated with a particular thread. If the topmost instrumented function is known to have long latency, sampling may be skipped. Examples of such functions may include functions which are known to cause the thread to sleep, or which wait on an internal or external event. If a function is known to have long latency, it may be unnecessary to sample the thread because an application specialist is likely to know what the thread was doing at this time and the function may not need sampling for additional detail. Therefore, the system may skip sampling for functions with known long latencies to reduce overhead. It is noted that a thread may be delayed in a waiting state much longer than was expected by the programmers. However, collecting stack trace samples for this thread may not get an application specialist any closer to finding the root cause of the prolonged wait.

Collected stack trace samples and corresponding timestamps can be attached to the topmost entry on the instrumented function stack. In other words, the samples and associated timestamps can be attached to the currently limning instrumented function. Since not all functions are instrumented, the actual running function may be different. The actual running function may be a non-instrumented function invoked directly or indirectly from the topmost instrumented function.

In addition to only sampling threads executing server requests and only sampling threads with timestamps older than a predetermined period of time, the system and method provide an additional way of reducing overhead. The frequency at which sampling is performed may be limited to reduce overhead. As described, many modern sampling systems sample at a frequency of up to 100 times per second or more. In accordance with an embodiment, an application may be sampled at a much lower rate. In one aspect, the system and method may sample an application less than 100 times per second. In another aspect, the system and method may sample an application less than ten times per second. Previous systems and methods have used a high sampling frequency to obtain satisfactory application performance data. However, the use of instrumentation in combination with sampling as provided herein can provide satisfactory application performance data at a reduced sampling frequency.

The system 100 may further include a reporting module 150 on the server 110 for reporting data obtained through sampling and instrumentation as described above. The reporting module (or report module) can be configured to combine the instrumented function operation data and the sampled function operation data to form a unified application performance report. This unified application performance report can be accessed by an application specialist to analyze application performance and troubleshoot issues (such as delays, etc.). The reporting module may include a monitoring tool configured to construct a representation of a server request call tree for display to the application specialist.

Figure 2:
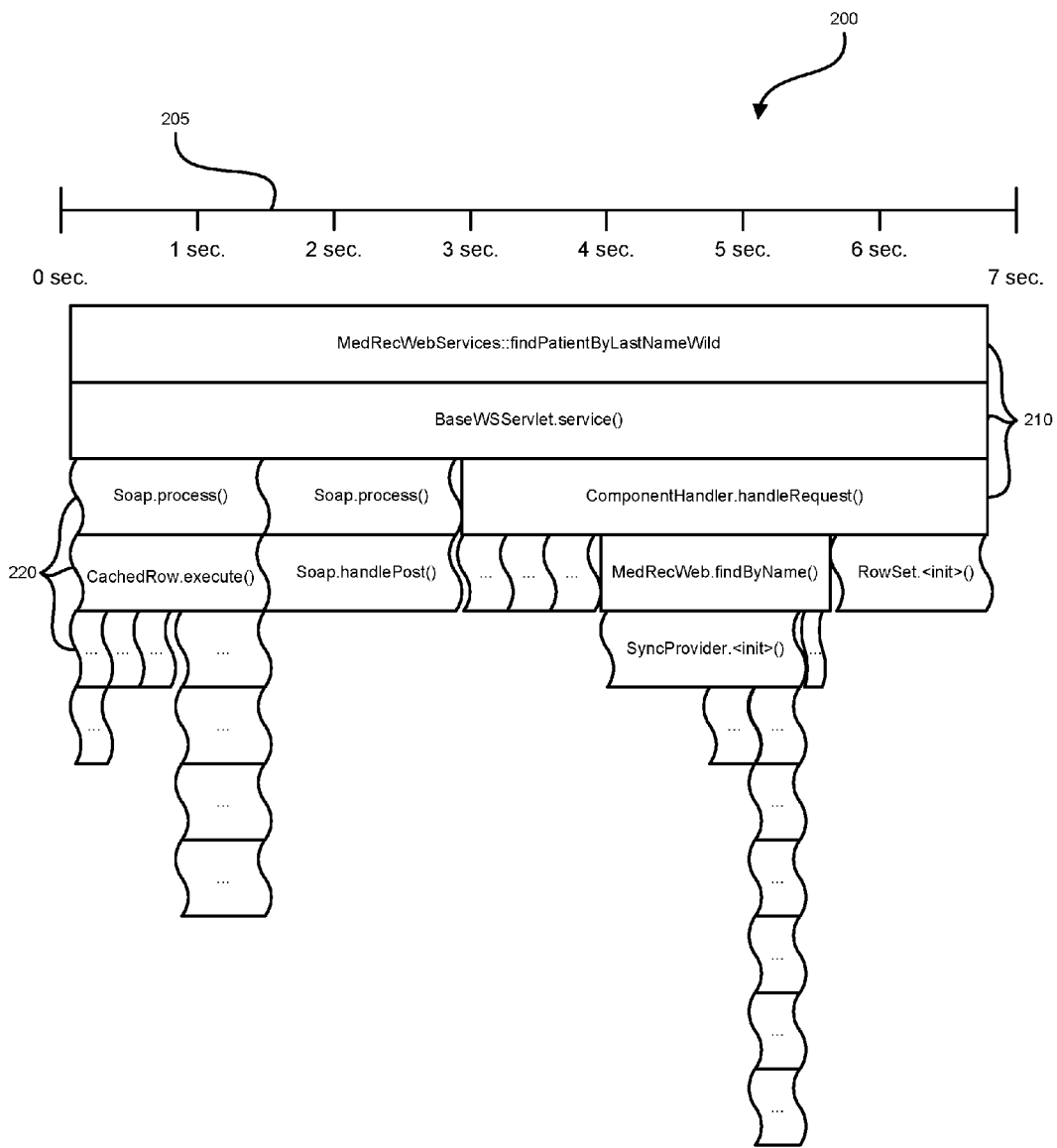
FIG. 2 is a representation of a server request call tree formed and displayed by a reporting module in accordance with an embodiment.

Referring to FIG. 2, an example of a server request call tree 200 (such as may be viewed by an application specialist) is shown with a timeline 205 indicating passage of time for invoked functions. Each of the type of boxes 210, 220 shown represent functions or methods of the application. Boxes 210 with straight edges can represent instrumented functions, since the start/end times of instrumented functions are known. Boxes 220 with wavy edges can represent sampled functions since start/end times of sampled functions can only be estimated or approximated. Example function names are displayed in the boxes. Three dots (" . . . ") have been used in smaller boxes to represent function names too lengthy to display in the box.

It is noted that sampling can provide caller/callee relationships. In other words, sampling can provide information about which sampled function was invoked, which function invoked the sampled function, and which other functions were invoked by the sampled function. When the monitoring tool constructs a representation of the server request call tree, the stack traces attached to invocations of instrumented functions can be analyzed. For each instrumented function invocation, the stack traces can be traversed to locate that function in the stack trace. Since the stack trace was taken while the invocation was in progress, this function will be found. In other words, the monitoring toot can analyze the instrumented function stack for sampling traces and use the caller/callee relationships to associate sampled functions with instrumented functions in order to create the server request call tree.

Portions of the stack traces which are "above" the instrumented function can be used to create an approximation of the call tree rooted at the instrumented function. The instrumented function stack operates on the principle of Last In First Out (LIFO) like other known stacks. Reference to elements of stack traces being "above" an instrumented function is referring to stack frames which were placed on the stack during the instrumented function invocation and are thus "above" the instrumented function. The stack may be visualized in this manner by turning FIG. 2 upside down and considering the topmost functions as the functions last invoked by lower functions in the stack.

In the example server request call tree, the sampled functions start/end times are approximated. The approximation does not have precise start/end times for the functions. These times can only be estimated based on the sampled timestamps for the stack traces and the timestamps of the events coming from the code instrumentation. Thus, the latencies of functions detected by sampling are also estimated. The whole call tree, including the approximated nodes, can be displayed by a graphical user interface component of the monitoring tool. The monitoring toot cm offer visual clues for the user to distinguish between nodes detected by instrumentation and the nodes detected by stack trace sampling, but the whole tree can form one consistent and conceptually uniform entity. While the depicted server request call tree uses straight and wavy edges to distinguish between instrumented and sampled function data, many other forms of distinction may also be used. For example, sampled function boxes may have gradations on the edges to represent imprecise start/end times, different colors may be used for instrumented and sampled data, etc.

Optionally, stack trace analysis can proceed with uninstrumented functions which are present in the stack traces "below" an instrumented function. This can allow insertion of additional nodes between the nodes created by code instrumentation, as opposed to adding them only at the bottom of the tree, as presented in FIG. 2.

Figure 3:
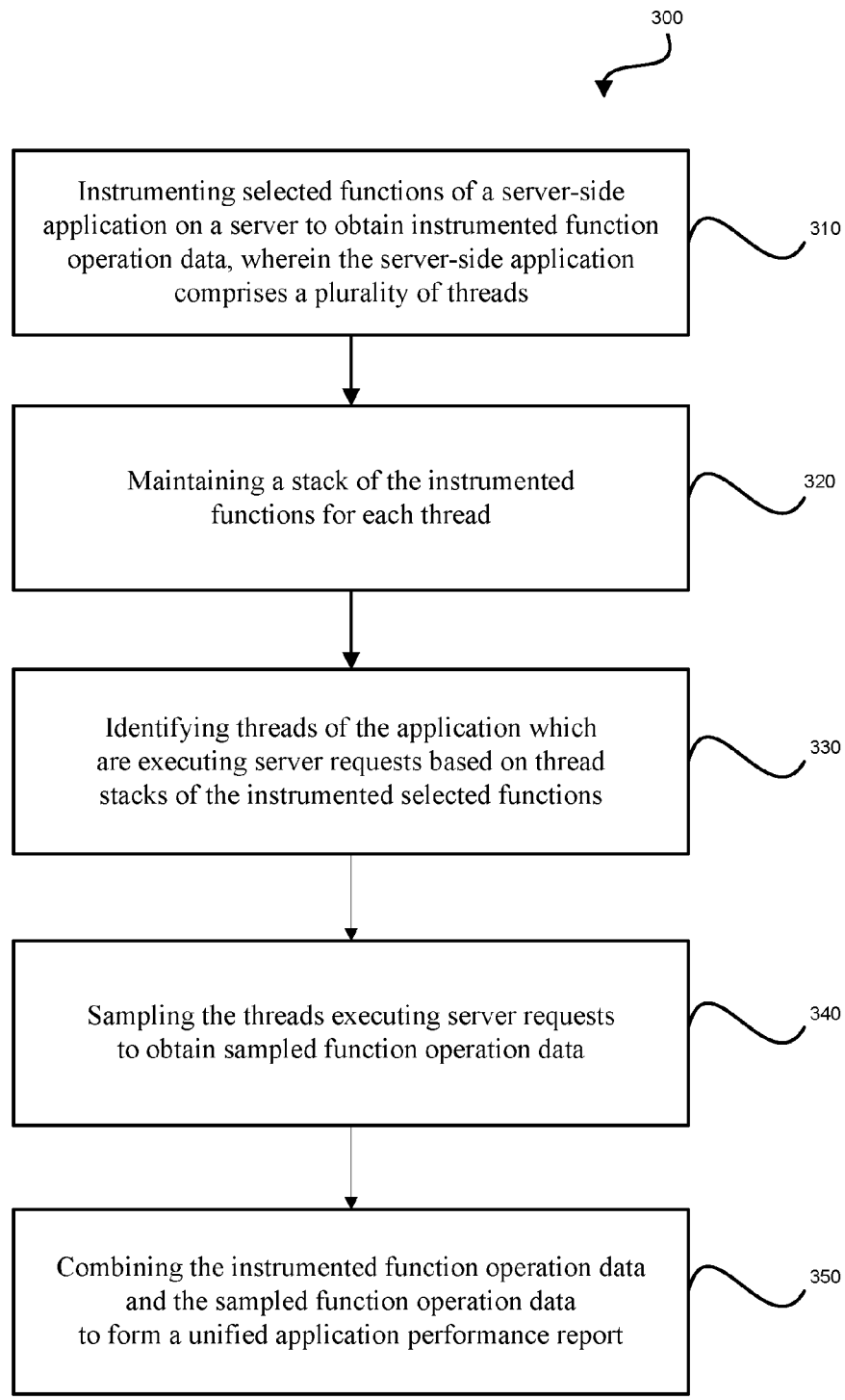
FIG. 3 is a flow chart of a method for collecting application performance data using information from application threads executing server requests in accordance with an embodiment.

Referring to FIG. 3, a method 300 is shown for collecting application performance data. Selected functions of a server-side application on a server can be instrumented 310 to obtain instrumented function operation data. The server-side application can include a plurality of threads. A call stack of the instrumented functions for each thread can be maintained 320. The stack can be maintained by the instrumentation module described above. Threads of the application which are executing server requests can be identified 330 based on thread stacks of the instrumented selected functions. For example, the instrumentation module can instrument the functions involved in the execution of server requests. Each thread can have a stack for the instrumented functions. If the call stack for a thread is empty, there are no active server requests and the thread need not be sampled. If the call stack is not empty, the thread is working on a server request and can be sampled. Accordingly, the method further includes sampling 340 the threads executing server requests to obtain sampled function operation data. The instrumented function operation data and the sampled function operation data can be combined 350 to form a unified application performance report.

In accordance with an embodiment, the instrumented function operation data can include timestamps of functions from the application threads. Additionally, for each thread, the timestamp of the most recent event (for example, function start/end) is recorded. Sampling the application threads can further include sampling application threads having a timestamp older than a predetermined period of time. Sampling application threads having a timestamp older than a predetermined period of time can further include only sampling threads with a timestamp older than a predetermined period of time and which are known to have exceeded a typical latency. In forming the unified application performance report, a determination can be made as to which server requests took greater than a predetermined amount of time to execute. This information can be flagged to be presented to an application specialist for further review. Also, as described in the system above, the method can include sampling the application threads using a dedicated sampling thread.

Figure 4:
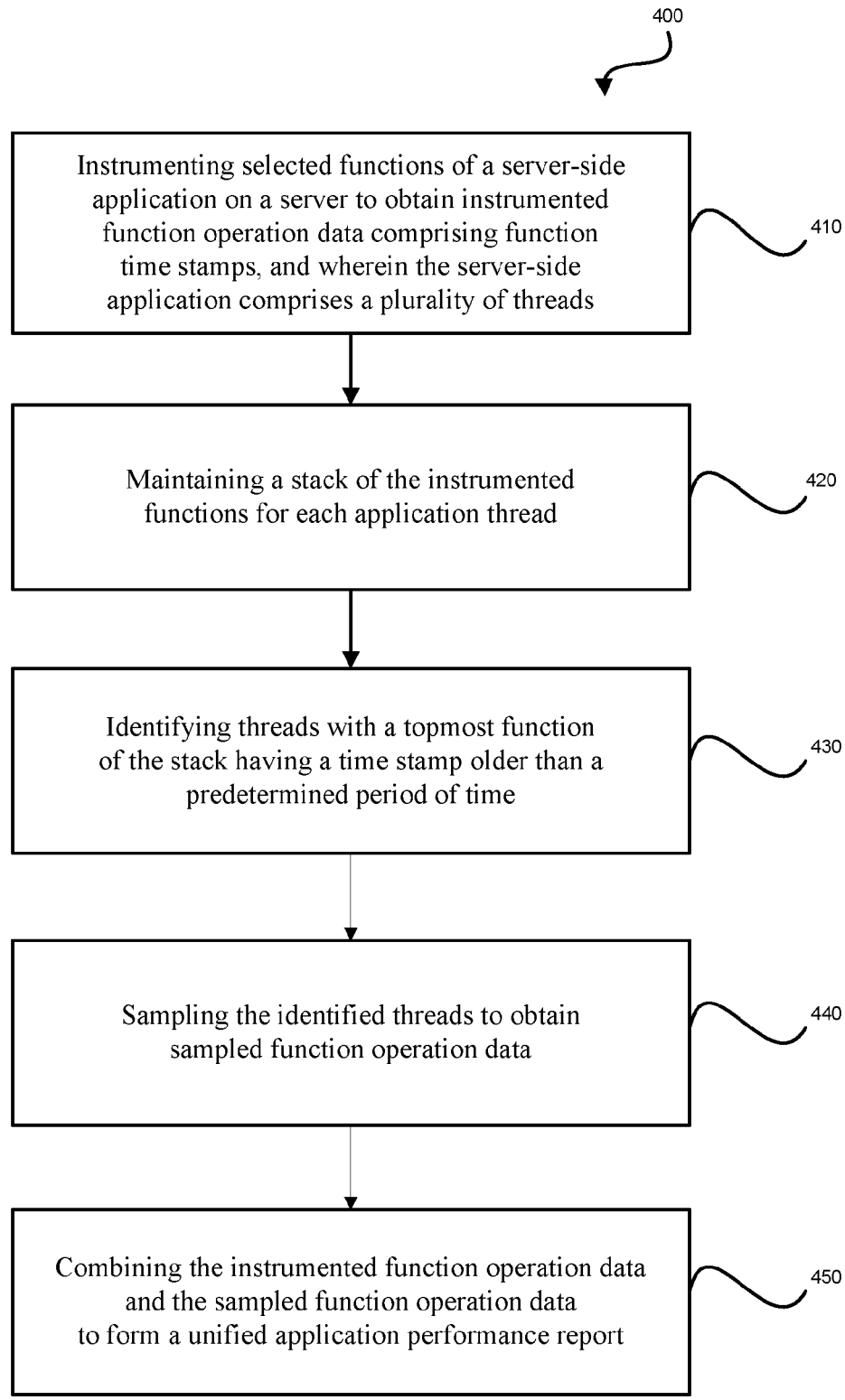
FIG. 4 is a flow chart of a method for collecting application performance data using timestamps of application threads in accordance with an embodiment.

Referring to FIG. 4, a method 400 is shown for collecting application performance data. Selected functions of a server-side application on a server can be instrumented 410 to obtain instrumented function operation data. The instrumented function operation data may comprise function timestamps. The server-side application may comprise a plurality of threads. A call stack of the instrumented functions for each application thread may be maintained 420. The stack may be maintained by the instrumentation module. Threads having a most recent timestamp older than a predetermined period of time can be identified 430. The identified threads may then be sampled 440 to obtain sampled function operation data. The instrumented function operation data and the sampled function operation data can be combined 450 to form a unified application performance report.

The system and method presented herein for collection of application performance data combines selective instrumentation and stack trace sampling. The data obtained from stack trace sampling can be integrated with the data obtained from instrumentation and be presented as one call tree for each selected server request.

The system and method can provide many benefits over prior systems and methods. The application performance data collection system and method can automatically deliver more details about long running instrumented functions, even if they are leaves of a call sub-tree based only on the instrumentation-based events. Thus, no performance analyst interaction may be required to get this additional information. The application performance data collection system and method can eliminate a need to insert additional instrumentation to the application in order to identity a leaf function that is responsible for performance bottlenecks. By limiting stack trace sampling to only those threads that are actively executing server requests and to those situations when the existing instrumentation does not deliver sufficient data, the performance overhead of the combined solution can be kept significantly lower than that of the prior art solutions. The system and method may be implemented with very low overhead, making it acceptable for continuous monitoring of applications deployed in production environments. The monitoring tool can provide a drill-down capability into offending server requests making it easier for an application specialist to troubleshoot performance issues.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for collecting application performance data, comprising:
instrumenting pre-determined functions of a server-side application on a server to obtain instrumented function operation data, wherein the server-side application comprises a thread;
maintaining an instrumented function call stack for each thread separate and distinct from a call stack provided by the application runtime environment;
identifying threads of the application which are executing server requests based on emptiness of thread stacks of the instrumented selected functions;
sampling the threads actively executing server requests with a non-empty instrumented function call stack to obtain sampled function operation data; and
combining the instrumented function operation data and the sampled function operation data to form a unified application performance report.

2. A method in accordance with claim 1, further wherein the instrumented function operation data comprises timestamps of application threads, and wherein sampling the application threads further comprises sampling application threads having a timestamp older than a predetermined period of time.

3. A method in accordance with claim 2, wherein sampling application threads having a timestamp older than a predetermined period of time further comprises only sampling threads with a timestamp older than a predetermined period of time and which are known to have exceeded typical latency.

4. A method in accordance with claim 1, wherein forming a unified application performance report comprises determining which server requests took greater than a predetermined amount of time to execute.

5. A method in accordance with claim 1, wherein sampling the application threads further comprises sampling the application threads using a dedicated sampling thread.

6. A method in accordance with claim 1, wherein forming the unified application performance report comprises constructing a server request call tree formed in part by locating instrumented functions in sampled stack traces.

7. A method in accordance with claim 6, wherein constructing a server request call tree comprises constructing a server request call tree having a timeline, definite start/end times for instrumented functions, and approximated start/end times for sampled functions.

8. The method of claim 1 wherein the combining includes constructing a timeline indicating passage of time for invoked instrumented functions and an approximation of a server request call tree rooted below respective instrumented functions.

9. The method of claim 8 wherein the approximation of the server request call tree may be visualized as a Last In First Out (FIFO) stack and offer visual clues for a user to distinguish between invoked instrumented functions and the approximation of the server request call trees rooted at respective instrumented functions.

10. A method for collecting application performance data, comprising:
instrumenting pre-determined functions of a server-side application on a server to obtain instrumented function operation data comprising function timestamps, and wherein the server-side application comprises a plurality of threads executing server requests;
maintaining an instrumented function stack for each application thread separate and distinct from a call stack provided by the application runtime environment;
identifying threads based on emptiness of an application thread instrumented function stack and having a most recent timestamp older than a predetermined period of time;
sampling the identified threads actively executing server requests with a non-empty instrumented function call stack to obtain sampled function operation data; and
combining the instrumented function operation data and the sampled function operation data to form a unified application performance report.

11. A method in accordance with claim 10, wherein sampling the identified threads comprises sampling only threads having a most recent timestamp older than a predetermined period of time and which are known to have exceeded typical latency.

12. A method in accordance with claim 10, wherein forming a unified application performance report comprises determining which server requests took greater than a predetermined amount of time to execute.

13. A method in accordance with claim 10, wherein forming the unified application performance report comprises constructing a server request call tree formed in part by locating instrumented functions in sampled stack traces.

14. A method in accordance with claim 10, wherein sampling the application threads further comprises sampling the application threads less than ten times per second.

15. The method of claim 10 wherein the combining includes constructing a timeline indicating passage of time for invoked instrumented functions and an approximation of a server request call tree rooted below respective instrumented functions.

16. The method of claim 15 wherein the approximation of the server request call tree may be visualized as a Last In First Out (FIFO) stack and offer visual clues for a user to distinguish between invoked instrumented functions and the approximation of the server request call trees rooted at respective instrumented functions.

17. A system for collecting application performance data, comprising:
a server configured to host a server-side application;
an instrumentation module on the server configured to selectively instrument functions of the server-side application to obtain instrumented function operation data comprising timestamps of functions in application threads, and further configured to
maintain an instrumented function call stack for each application thread separate and distinct from a call stack provided by the application runtime environment, and
identify threads based on emptiness of an application thread instrumented function stack and having a most recent timestamp older than a predetermined period of time; and
a sampling module on the server configured to sample application threads of the server-side application to obtain sampled function operation data wherein the sampling module is configured to sample application threads based on at least one of an age of the timestamp obtained through instrumentation and a determination of which threads are executing active server requests based on emptiness of the stack.

18. The system of claim 17, further comprising a reporting module to combine the instrumented function operation data with respective sampled function operation data shown below to form a unified application performance report.

19. A system in accordance with claim 18, wherein the reporting module is further configured to construct a server request call tree formed in part by locating instrumented functions in sampled stack traces.

20. The system of claim 19, wherein the approximation of the server request call tree may be visualized as a Last In First Out (FIFO) stack and offer visual clues for a user to distinguish between the instrumented function operation data and the sampled function operation data.

* * * * *